United States Patent Office 3,310,552
Patented Mar. 21, 1967

3,310,552
WATER-SOLUBLE MONOAZO DYESTUFFS
Hans Ischer, Basel, Switzerland, assignor to Sandoz Ltd. (also known as Sandoz A.G.), Basel, Switzerland
No Drawing. Filed Feb. 3, 1964, Ser. No. 342,239
Claims priority, application Switzerland, Oct. 25, 1957, 51,963/57; Dec. 11, 1957, 53,627/57
4 Claims. (Cl. 260—200)

The present application is a continuation-in-part of my application Ser. No. 768,032, filed Oct. 20, 1958 (abandoned since the filing of the present application). It relates to water-soluble dyestuffs of the formula $$[A]\!\!-\!\!(O\!-\!CH_2\!-\!CH_2\!-\!O\!-\!SO_2\!-\!R)_p \quad (I)$$

wherein
A represents a p-valent water-soluble dyestuff radical bearing from one to three sulfonic acid groups and selected from the group consisting of benzene-azo-naphthyl,
benzene-azo-1-phenylene-pyrazolone,
benzene-azo-diphenyl-azo-phenyl,
1-phenyl-pyrazolone-azo-phenyl,
naphthalene-azo-phenyl,
naphthalene-azo-diphenylyl,
naphthalene-azo-naphthyl,
1-naphthyl-pyrazolone-azo-phenyl,
naphthalene-azo-benzene-azo-phenyl,
naphthalene-azo-diphenyl-azo-phenyl, R represents a radical selected from the group consisting of lower alkyl, phenyl, methylphenyl, sulfophenyl, chlorophenyl, naphthyl and mono- and di-sulfonaphthyl; and p is an integer from 1 to 2, inclusive.

In the new dyestuffs the free bond of the oxygen atom of the substituent is linked to an aromatic nucleus of [A], preferably a phenyl or naphthyl nucleus, directly or indirectly over bridge members such as

—NH—COO—CH₂—CH₂—

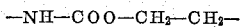

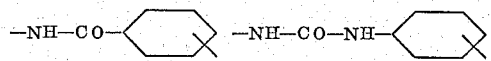

or

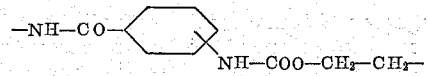

the —NH-group being linked to an aromatic nucleus of the dyestuff.

The process for the production of the new dyestuffs consists in esterifying dyestuffs of the formula $$[A]\!\!-\!\!(O\!-\!CH_2\!-\!CH_2\!-\!OH)_p \quad (II)$$

wherein A and p have the afore-cited meanings, and the group or groups —O—CH₂—CH₂—OH are linked to an aromatic nucleus of [A], preferably a phenyl or naphthyl nucleus, directly or indirectly over bridge members such as —NH—COO—CH₂—CH₂—,

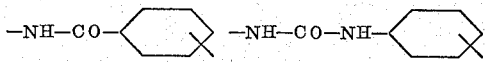

or

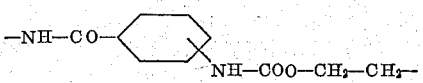

the —NH-group being linked to an aromatic nucleus of the dyestuff, with a functional derivative of a sulfonic acid of the formula $$R\!-\!SO_2\!-\!OH \quad (III)$$

wherein R has the above-named meaning, or in converting compounds of the formula $$[A_1]\!\!-\!\!(O\!-\!CH_2\!-\!CH_2\!-\!O\!-\!SO_2\!-\!R)_p \quad (IV)$$

wherein R and p have the above-named meanings, and A₁ represents an organic radical capable of azo dyestuff formation, into the dyestuffs of the Formula I by azoic coupling, the components being in every case so chosen that the resulting dyestuff radical A contains 1 to 3 sulfonic acid groups.

For the production of dyestuffs of the Formula I in which the group or groups

—O—CH₂—CH₂—O—SO₂—R are liinked to an aromatic nucleus [A] indirectly over a bridge member a suitable procedure is to start from an azo dyestuff containing an acylatable amino group or an intermediate containing an acylatable amino group and to acylate the amino group with a compound such as $$Cl\!-\!OC\!-\!O\!-\!CH_2\!-\!CH_2\!-\!O\!-\!CH_2\!-\!CH_2\!-\!O\!-\!SO_2\!-\!R \quad (V)$$

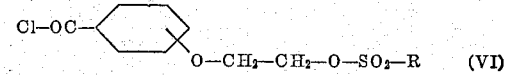

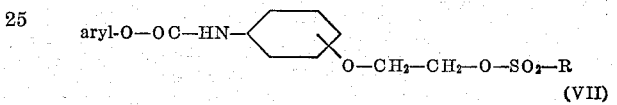

or

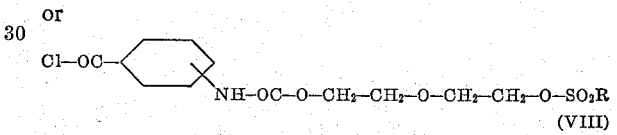

wherein R has the afore-cited meaning, and aryl is naphthyl or preferably phenyl, and to convert the intermediates into dyestuffs by azoic coupling, the reactants being so chosen that the dyestuff radical A contains 1 to 3 sulfonic acid groups.

Beside the sulfonic acid groups the dyestuffs of the invention may of course bear other water-solubilizing groups such as hydroxy, carboxy, sulfonic acid amide which may be monosubstituted on the nitrogen atom, amino, low molecular mono- or dialkylamino (CH₃—NH—, C₂H₅—NH—, HO—C₂H₄—NH,
CH₃—CHOH—CH₂—NH—, CH₃—O—C₃H₆—NH—), methylsulfonyl and low molecular alkanoylamino (CH₃—CO—NH—, C₂H₅—CO—NH—).

Important organic sulfonic acids, whose functional derivatives may be employed, are e.g. benzene-sulfonic acid, 2- or 4-methylbenzene-1-sulfonic acid, 2- or 4-chlorobenzene-1-sulfonic acid, naphthalene-1-sulfonic acid, naphthalene2-sulfonic acid, methanesulfonic acid, ethanesulfonic acid, 1- or 2-propane--sulfonic acid, n-butane- or isobutane-sulfonic acid, pentane- or isopentane-sulfonic acid, 1.3-benzenedisulfonic acid, naphthalenedi- or trisulfonic acids.

Under functional derivatives are understood primarily the halides and anhydrides. Of the halides, the chlorides are foremost in importance on account of the ease with which they are obtained and their low cost. Especially interesting representatives are the sulfonic acid chlorides of the aliphatic or aromatic series, e.g. 4-methylbenzene-1-sulfonic acid chloride, benzenesulfonic acid chloride, methanesulfonic acid chloride and ethanesulfonic acid chloride.

The reaction of the functional derivatives with the compounds of Formula II can be conducted in aqueous medium, preferably in presence of an acid-binding agent, e.g. sodium hydroxide, at temperatures of 0° to 100° C., preferably at 0–25° C. in strongly alkaline solution. Alternatively, the reaction can be effected in an aqueous-organic medium, especially in the case of intermediates which are only slightly soluble in water, provided that the employed organic solvent does not react with the sulfonic acid derivative. When the sulfonic acid derivative is solid at room temperature, it is advisable to dissolve it in an organic solvent such as benzene, toluene, chlorobenzene or acetone and to drop the organic solution in the well stirred solution of the dyestuff or intermediate bearing a group —O—$CH_2$—$CH_2$—OH. The acylation of water-insoluble intermediates can also be carried out in an organic solvent e.g. in pyridine.

If the symbol $A_1$ stands for the radical of an organic compound capable of dyestuff formation, the reaction products are converted into dyestuffs by azoic coupling under such conditions that splitting of the ester group —O—$SO_2$—R is precluded, e.g. in acid to alkaline medium at preferably low to moderate temperatures.

The organic compounds of Formula IV, in which $A_1$ stands for the radical of an organic compound capable of azo dyestuff formation, can be either amines or diamines convertible into diazo or tetrazo compounds, or compounds which contain one or two substituents convertible into amino groups, or compounds capable of coupling from which azo dyestuffs are built by the known methods.

The condensation of amino dyestuffs or amino intermediates with the compounds (V) to (VIII) is carried out advantageously in aqueous medium in the temperature range of 0° to 40° C. and in the presence of acid-binding agents, a low temperature being required when the reaction medium is strongly alkaline and a temperature of about 20° to 40° C. when the reaction medium is nearly neutral (pH value of about 5 to 8).

The condensation can also often be effected in anhydrous pyridine at temperatures below 50° C.

The compounds of Formula V are readily obtainable from sulfonic acids and ethylene oxide with subsequent phosgene treatment, e.g.

Cl—CO—O—$CH_2$—$CH_2$—O—
  $CH_2$—$CH_2$—O—$SO_2$—$C_7H_7$
Cl—CO—O—$CH_2$—$CH_2$—O—
  $CH_2$—$CH_2$—O—$SO_2$—$CH_3$

The new dyestuffs can contain groupings which form neutral complexes, for example, ortho-ortho'-substituted azo groups of the formula

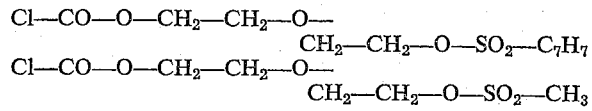

wherein $u$ stands for —OH, —COOH, —O-alkyl or —O—$CH_2$—COOH, or metal complex forming groups of salicyclic acid, ortho-hydroxy-quinoline, etc. The dyestuffs may themselves be metal complex compounds; for this type of product preference is given to the complex compounds of chromium, manganese, iron, cobalt, nickel or copper.

The new dyestuffs which contain a total of 1 to 2 sulfonic acid groups are especially suitable for the acid dyeing of wool silk and synthetic polyamide fibers and for the exhaustion dyeing of natural or regenerated cellulosic fibers (cotton, linen, cuprammonium rayon, viscose filament yarn and viscose staple fiber). The dyestuffs with 2, 3 or more sulfonic acid groups—one to two sulfonic acid groups occurring optionally in the radical R—are well soluble in water and well suited for application in dyeing machines, in padding and continuous dyeing methods such as the Pad-Roll, Pad-Jig and Molten Metal processes, and in textile printing.

The dyestuffs reserve acetate, triacetate, polyethylene terephthalate, polyvinyl chloride, polyvinyl acetate, polyethylene and polypropylene fibers.

The splitting of the —O—$SO_2$—R group which occurs during dyeing, padding or printing can be effected in the dyeing, padding or printing medium or in a fresh bath, if desired after intermediate drying. If a fresh bath is used it is advisable to accomplish removal of the —O—$SO_2$—R group in presence of water-soluble salts, e.g. sodium sulfate or chloride, in order to preclude a partial redissolving of the dyestuff in the liquor. Splitting off of the —O—$SO_2$—R group and fixation of the dyestuff radical also can take place under the action of steam or of dry heat, e.g. under the conditions used for heat setting. This operation can be markedly accelerated and the requisite temperature reduced by adding to the dyeing or after-treating bath agents of acid or alkaline reaction as catalysts.

In the dyeing, printing or padding of animal fibers and synthetic polyamide fibers it is desirable to apply and fix the dyestuffs from an acid, neutral or weakly alkaline medium, e.g. in presence of acetic acid, formic acid, sulfuric acid, ammonium sulfate, lactic acid, oxalic acid, sodium acetate, sodium bicarbonate, sodium or potassium carbonate, sodium meta-phosphate, trimethylamine, pyridine, quinoline, etc. Particularly good results are obtained on wool by dyeing from an acetic acid to neutral bath in presence of levelling agents, e.g. polyoxethylated fatty amines or mixtures of such amines with alkyl-polyglycol ethers, and adjusting the bath neutral or weakly alkaline at the end of dyeing with small amounts of an agent of alkaline reaction, e.g. ammonia, sodium bicarbonate or carbonate, etc. or compounds which react alkaline in heat, e.g. hexamethylene tetramine or urea.

In the dyeing, padding or printing of cellulosic fibers the —O—$SO_2$—R group is split off preferably in alkaline medium, e.g. in presence of sodium carbonate or hydroxide, potassium carbonate or hydroxide, calcium hydroxide, trisodium phosphate, ammonia, trimethylamine, quaternary bases such as tetraalkylammonium compounds, etc.

On fixation the dyed, padded or printed material is thoroughly rinsed and soaped to remove the proportion of dyestuff which has not been fixed on the substrate.

Under the conditions of the dyeing process upon which the invention is based, the dyestuffs are fixed on the fiber by the formation of a chemical linkage between the reactive groups of the animal or cellulosic fiber and the dyestuffs with removal of the compound

R—$SO_3H$ a circumstance which explains the outsanding wet fastness properties of the dyeings, especially the fastness to washing, milling, perspiration, water, sea-water, cross-dyeing and dry cleaning of the dyeings on animal fibers and on synthetic polyamide fibers and the fastness to washing, perspiration, water, sea-water, cross-dyeing and dry cleaning of the dyeings on cellulosic fibers.

The dyestuffs which are free from hydrolyzable groups such as acylamino groups also possess an excellent fastness to soda-boiling.

In addition the dyeings on wool are level and possess a good fastness to light. The dyeings on cellulosic fibers too are fast to light.

In the following examples the parts and percentages are by weight and the temperatures are in degrees centigrade.

Example 1

28.8 parts of the dyestuff (in the free acid form) obtained by coupling diazotized 4-amino-(2'-hydroxy)-ethoxybenzene with 1-hydrovynaphthalene-3.6.8-trisulfonic acid in alkaline medium are dissolved in 280 parts of 2-normal sodium hydroxide solution at 40°. The solution is cooled to 0–5°, a solution of 40 parts of benzenesulfonic acid chloride in 100 parts of chlorobenzene is added, and the whole is vigorously stirred at 0–5° for 5 hours. Subsequently the chlorobenzene is separated, and the aqueous solution of the dyestuff made weakly acid with acetic and heated to 65°. The readily soluble dyestuff is now salted out with 200 parts of barium chloride, filtered off and dried in vacuo at 80°.

The new dyestuff is a brown-red powder which dissolves in water to give brilliant ruby-red solutions.

Example 2

30.7 parts of the compound produced by reacting 3-nitro-1-(2'-hydroxy)-ethoxybenzene with 4-methylbenzenesulfonic acid chloride in dry pyridine and then reducing the nitro group to the amino group, are dissolved in 200 parts of water and 30 parts of 30% hydrochloric acid at 0–5° and diazotized by the addition of 29 parts of a 4-normal sodium nitrite solution with thorough stirring. The resulting diazo solution is then dropped into a solution, cooled to 0°, of 36.1 parts of 1-acetylamino-8-hydroxynaphthalene-3,6-disulfonic acid in 400 parts of water and 40 parts of sodium carbonate with thorough stirring. Coupling begins immediately. The reaction solution is stirred overnight without cooling, after which 180 parts of sodium chloride are added, the precipitated dyestuff filtered off and dried in vacuo at 50°.

The new dyestuff is a dark powder which dissolves in water with a red coloration.

Example 3

58.4 parts of 4,4'-diamino-2,2'-dimethyl-1,1'-diphenyl-5-sulfonic acid are dissolved in 500 parts of water and 54 parts of 30% sodium hydroxide solution. 700 parts of ice are added with stirring to bring the temperature down to 0°. The solution is now of strongly alkaline reaction. About 64.5 parts of the chloroformic acid ester, obtained by treating with phosgene the addition product of 2 mols of ethylene oxide and 1 mol of 4-methylbenzene-1-sulfonic acid, are added slowly and the reaction mass is then stirred at 0–5° for several hours. Toward the end of the reaction the temperature is gradually increased to about 20°. As soon as the reaction is completed the acylation product, which now contains only one diazotizable amino group, is precipitated with hydrochloric acid and isolated. The product is stirred into 1500 parts of water and after the addition of about 25 parts of 25% ammonia to render it weakly alkaline it is dissolved by heating to a moderate temperature. 14 parts of sodium nitrite are added to the solution, which is then run into a ice-cooled mixture of 140 parts of 30% hydrochloric acid, 200 parts of water and 600 parts of ice. The diazo compound is precipitated immediately. As soon as diazotization is completed any excess of nitrous acid is destroyed with a little amidosulfonic acid and the diazo compound filtered off. The compound is added at about 20° with vigorous stirring to an aqueous solution containing 52.6 parts of 2-amino-8-hydroxynaphthalene-6-sulfonic acid, 33 parts of 30% sodium hydroxide solution and 60 parts of crystallized sodium acetate, adjusted to pH 5 with acetic acid. Stirring is continued overnight, after which the diazo compound is no longer indicated. The deep red dyestuff thus obtained is isolated in the normal way and dried in vacuo at 50–60°.

The new dyestuff is a dark powder which dissolves in water to give red solutions.

Example 4

45.3 parts of the monoazo dyestuff, obtained by diazotization of 1-aminobenzene-2,5-disulfonic acid and subsequent coupling with 1-(3'-amino)-phenyl-3-methyl-5-pyrazolone in alkaline medium, are dissolved in 400 parts of water. To the neutralized solution are gradually added with vigorous stirring 31 parts of the chloroformic acid ester which is obtained by treating the reaction product of 2 moles of ethylene oxide and 1 mole of benzenesulfonic acid with phosgene. At the same time a sodium carbonate solution is added dropwise to maintain the pH of the reaction mixture between 7.5 and 5.5. When no free amino group is indicated, the reaction is completed. The dyestuff is salted out with sodium chloride, filtered with suction and dried in vacuo at 50–60°.

The new dyestuff is a brown-yellow powder which dissolves in water with a clear yellow coloration.

The same condensation can be effected in anhydrous pyridine at a temperature below 50°; the dyestuff thus formed is precipitated by pouring the reaction mass into a mixture of water, ice and hydrochloric acid, the temperature being maintained below 20° and sodium chloride being added if desired.

The following table contains further dyestuffs containing reactive groups which are obtainable by the methods described in Examples 1 to 4. In the table they are characterized by their structural formulae (column I) and the coloration of their aqueous solutions (column II).

| | (I) | (II) |
|---|---|---|
| (5) | [naphthalene(HO$_3$S, OH, HO$_3$S, SO$_3$H)]—N=N—[phenyl]—O—CH$_2$—CH$_2$—O—SO$_2$—[phenyl]—Cl | Red. |
| (6) | [naphthalene(OH, HO$_3$S, SO$_3$H)]—N=N—[phenyl]—O—CH$_2$—CH$_2$—O—SO$_2$—[phenyl]—CH$_3$ | Red. |
| (7) | [naphthalene(HO$_3$S, OH, HO$_3$S, SO$_3$H)]—N=N—[phenyl]—O—CH$_2$—CH$_2$—O—SO$_2$—[naphthalene] | Scarlet. |
| (8) | [phenyl(OH, SO$_3$H, SO$_3$H)]—N=N—[phenyl]—O—CH$_2$—CH$_2$—O—SO$_2$—[phenyl]—CH$_3$ | Orange. |

| | (I) | (II) |
|---|---|---|
| (9) | [naphthalene with NH₂, OH, SO₃H]—N=N—[benzene with SO₃H]—NH—CO—O—CH₂—CH₂—O—CH₂—CH₂—O—SO₂—[benzene]—CH₃ | Bluish red. |
| (10) | [naphthalene with NHCH₃, SO₃H]—N=N—[benzene]—NH—COO—CH₂—CH₂—O—CH₂—CH₂—O—SO₂—[benzene]—CH₃ | Bluish red. |
| (11) | [naphthalene with HO₃S, OH, SO₃H]—N=N—[benzene with SO₃H]—[benzene with two CH₃]—NH—COO—CH₂—CH₂—O—CH₂—CH₂—O—SO₂—[benzene]—CH₃ | Scarlet. |
| (12) | [naphthalene with OH, SO₃H]—N=N—[benzene with SO₃H]—[benzene with two CH₃]—NH—COO—CH₂—CH₂—O—CH₂—CH₂—O—SO₂—C₂H₅ | Scarlet. |
| (13) | [benzene with SO₃H]—N=N—[naphthalene with OH, HO₃S]—NH—COO—CH₂—CH₂—O—CH₂—CH₂—O—SO₂—[benzene] | Orange. |
| (14) | [benzene with O-cyclohexyl(CH₂)₅ group]—[benzene with SO₃H]—N=N—[naphthalene with OH, HO₃S, SO₃H]—NH—CO—[benzene]—O—CH₂—CH₂—O—SO₂—[naphthalene with SO₃H] | Red. |
| (15) | [naphthalene with SO₃H, HO₃S]—N=N—[naphthalene with OH]—NH—CO—NH—[benzene]—O—CH₂—CH₂—O—SO₂—CH₃ | Red. |
| (16) | [naphthalene with SO₃H, HO₃S, SO₃H]—N=N—[naphthalene with OH]—NH—COO—CH₂—CH₂—O—CH₂—CH₂—O—SO₂—[benzene] | Red. |

| | (I) | (II) |
|---|---|---|
| (17) | Structure: sulfonated aniline-NHCO-NH-phenyl-O-CH₂-CH₂-O-SO₂-tolyl coupled via azo to pyrazolone with 2,5-dichlorophenyl and methyl; SO₃H, HO substituents | Greenish yellow. |
| (18) | Structure: disulfonated phenyl-N=N-pyrazolone(CH₃, OH)-N-phenyl-NH-COO-(CH₂-CH₂-O)₂-SO₂-CH₃ | Yellow. |
| (19) | CH₃-CO-NH-phenyl(SO₃H)-N=N-pyrazolone(OH, CH₃)-N-phenyl-O-CH₂-CH₂-O-SO₂-C₃H₇-n | Greenish yellow. |
| (20) | Structure: NH-(COO-CH₂-CH₂-O-CH₂-CH₂-O-SO₂-C₂H₅) substituted phenyl(SO₃H)-N=N-pyrazolone(OH,CH₃)-N-naphthyl(SO₃H)₂ | Yellow |
| (21) | Structure: NH-(COO-CH₂-CH₂-O-CH₂-CH₂-O-SO₂-phenyl) phenyl(SO₃H)-N=N-pyrazolone(OH,CH₃)-N-naphthyl(SO₃H)₂ | Yellow. |
| (22) | COOH, HO₃S phenyl-N=N-naphthol-NH-CO-NH-phenyl-O-CH₂-CH₂-O-SO₂-tolyl(CH₃) | Orange. |
| (23) | Naphthyl(SO₃H)₂-N=N-phenyl-O-CH₂-CH₂-O-SO₂-phenyl-CH₃ | Yellow brown. |
| (24) | Phenyl(SO₃H, NH-CO-O-CH₂-CH₂-O-CH₂-CH₂-O-SO₂-tolyl)-N=N-naphthol(HO₃S, SO₃H)(NH-CO-phenyl) | Red. |
| (25) | CH₃-O, OH, HO₃S, SO₃H naphthyl-N=N-phenyl-O-CH₂-CH₂-O-SO₂-C₄H₉n | Blue red. |

| | (I) | (II) |
|---|---|---|
| (26) | 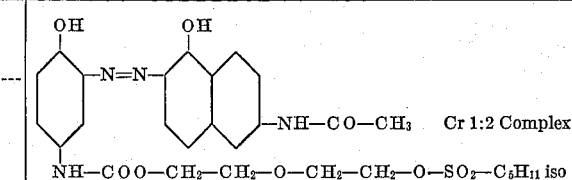 | Gray violet. |
| (27) | 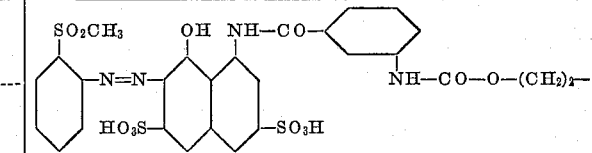 | Red. |
| (28) | 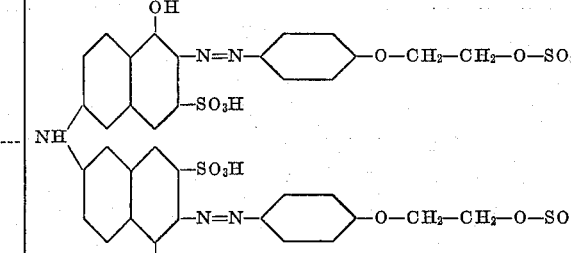 | Violet red. |
| (29) | 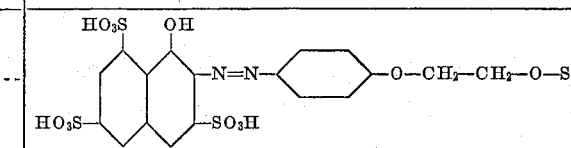 | Red. |
| (30) | 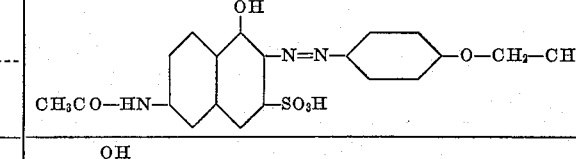 | Orange. |
| (31) | 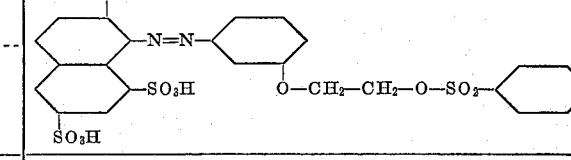 | Scarlet. |
| (32) | 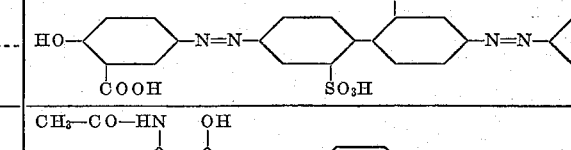 | Yellow brown. |
| (33) | 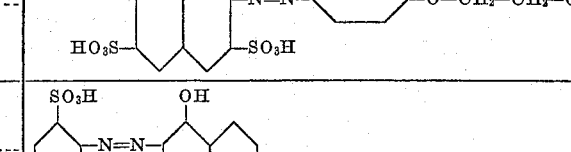 | Red. |
| (34) | 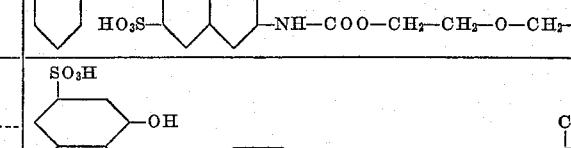 | Orange. |
| (35) | 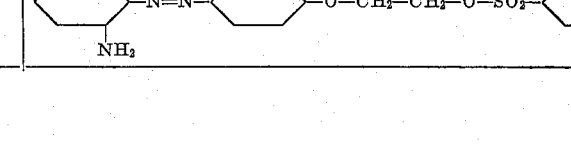 | Red. |

| | (I) | (II) |
|---|---|---|
| (36) | (structure: triazine with three NH-phenyl-SO₃H groups, one bearing azo link to pyrazolone with CH₃, N-phenyl-O-CH₂-CH₂-O-SO₂-phenyl-CH₃) | Yellow. |
| (37) | (structure: naphthalene with HO₃S, OH, SO₃H substituents, azo-linked to phenyl-O-CH₂-CH₂-O-SO₂-naphthyl) | Red. |
| (38) | HO₃S–naphthyl–SO₂–O–(CH₂)₂–O–phenyl–N=N–naphthyl(OH)(HO₃S)(NH–CO–CH₃) | Blue red. |
| (39) | SO₃H, SO₃H–naphthyl–SO₂–O–CH₂–CH₂–O–phenyl–N=N–naphthyl(OH)(SO₃H) | Orange. |
| (40) | HO₃S–phenyl–N=N–phenyl(SO₃H)–N=N–naphthyl(OH)(SO₃H)–NH–COO–CH₂–CH₂–O–CH₂–CH₂–O–SO₂CH₃ | Red. |
| (41) | (structure: naphthyl with NH–CH₃, SO₃H, azo-linked to HO₃S-phenyl; second phenyl-SO₃H with N=N–phenyl–O–CH₂–CH₂–O–SO₂–phenyl–CH₃) | Scarlet. |
| (42) | HO₃S–phenyl(O–Cu–O)–N=N–naphthyl(HO₃S)–NH–COO–CH₂–CH₂–O–CH₂–CH₂–O–SO₂–phenyl–CH₃ | Ruby. |

| | (I) | (II) |
|---|---|---|
| (43) | 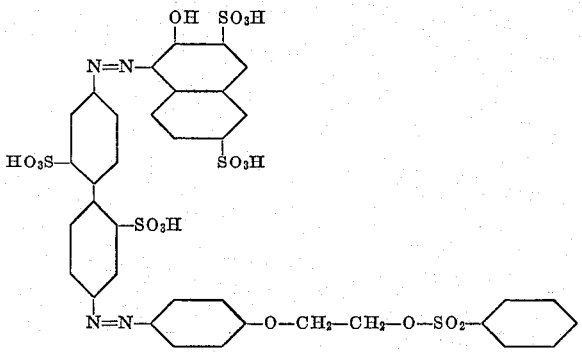 | Scarlet. |
| (44) | 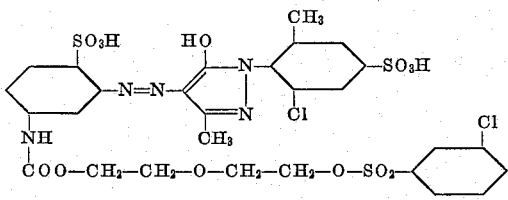 | Greenish yellow. |
| (45) | 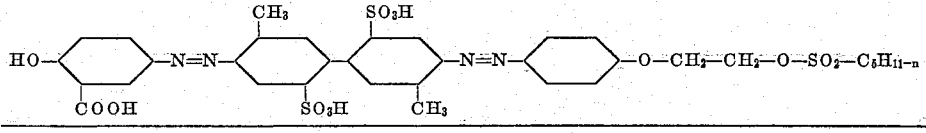 | Brown. |
| (46) | 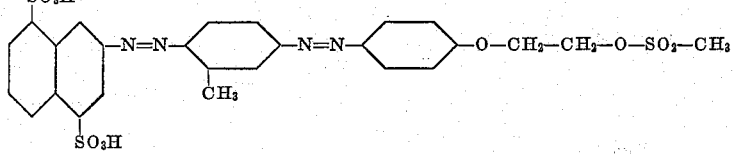 | Orange brown. |
| (47) | 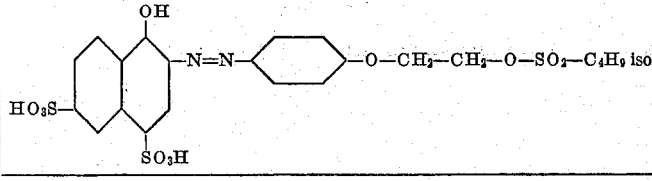 | Orange-scarlet. |
| (48) | 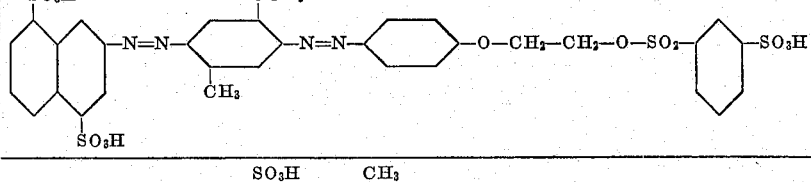 | Orange-brown. |
| (49) | 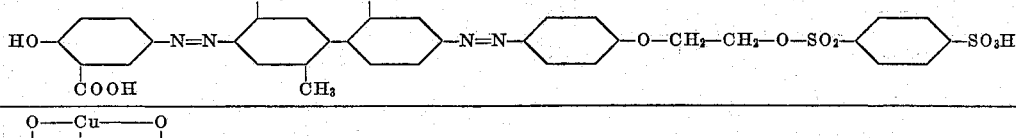 | Brown. |
| (50) | 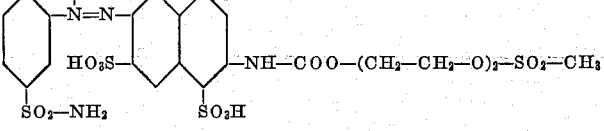 | Ruby. |

*Example 51*

A dyebath is prepared with 1 part of the dyestuff of Example 1, 1.5 parts of formic acid and 6000 parts of water. It is heated to 40° and at this temperature 100 parts of wool, previously wetted out, are entered. The bath is brought to the boil in 30 minutes and boiled for 1 hour. The dyed wool is then rinsed well in hot water and dried.

The brilliant red dyeing obtained is level and has outstanding fastness to washing and milling and good light fastness.

Synthetic polyamide fibers are dyed in similar manner, whereas for the dyeing of silk a somewhat lower temperature, e.g. 90–95°, is preferred.

Example 52

100 parts of a cotton sateen fabric are padded at room temperature in 1000 parts of a 3% neutral aqueous solution of dyestuff No. 8 of the table in presence of 1 part of Turkey red oil. The padded fabric is squeezed to 2–2½ times its original weight and then dried. It is entered in a developing bath of 758 parts of water, 240 parts of Glauber's salt and 2 parts of 30% sodium hydroxide solution at 85–95° and treated for 30 minutes. The cotton is then well washed in cold water, soaped at the boil for 10 minutes in a fresh bath containing 3 parts of soap and 2 parts of sodium carbonate in 995 parts of water, washed again and dried.

The cotton is dyed in an orange shade of outstanding wet fastness and good light fastness. A dyeing with the same all-round properties is obtained when 20 parts of 30% sodium hydroxide solution or 15 parts of trisodium phosphate are used in place of 2 parts of 30% sodium hydroxide solution.

The dried pad-dyeing can also be fixed by steaming for 10 minutes at 102–104°, by dry heating for about 5 minutes at 140–150° or by conditioning for 5–6 hours at 85–90° in a moist atmosphere.

Example 53

A printing paste composed of

| | |
|---|---|
| Dyestuff of Example 5 | 30 |
| Urea | 50 |
| Water | 290 |
| Sodium carbonate | 30 |
| 30% sodium hydroxide solution | 10 |
| Gum tragacanth, 80:1000 | 590 | is printed on a roller printing machine on a viscose staple fiber fabric. The print is dried and steamed for 15 minutes at about 102°, then washed well in cold water, soaped at the boil for 10 minutes as indicated in Example 52 and again well washed in water.

After drying, a red print of outstanding washing fastness and good light fastness is obtained.

The fixation can also be carried out by dry heating at 140–150° for about 5 minues.

Example 54

2.5 parts of the dyestuff of Example 28 are dissolved in 2000 parts of water. At 40–50° 100 parts of a fabric of viscose filament yarn are entered in the bath, to which 100 parts of common salt are gradually added over 30–45 minutes. As soon as the dyestuff has exhausted onto the fabric, 20 parts of tri-sodium phosphate are added and the temperature increased to 85—90°, treatment being continued at this temperature for 45–60 minutes to bring about fixation. The dyed fabric is subsequently rinsed, soaped, rinsed again and dried.

A brilliant violet-red dyeing is obtained which has extremely good wet fastness properties and good light fastness.

Example 55

2 parts of the dyestuff of Example 3 are dissolved in 4000 parts of water. To the solution are added 2 parts of acetic acid and 3 parts of a mixture of a polyoxethylated fatty amine and an alkylpolyglycol ether. 100 parts of a wool fabric are introduced into this bath at 50–60°. The bath is raised to the boil in 15–20 minutes and maintained at the boil for 45–60 minutes. At this point about 3 parts of 25% ammonia or 3 parts of hexamethylenetetramine are added at 85–90° and treatment continued for 20 minutes at 90°. The dyed wool is subsequently rinsed well, with some acetic acid added to one of the rinsing waters and then dried.

The brilliant red dyeing so produced is level, has excellent washing, perspiration and milling fastness and good fastness to light.

Formulae of representative dyestuffs of the foregoing are:

Example 1

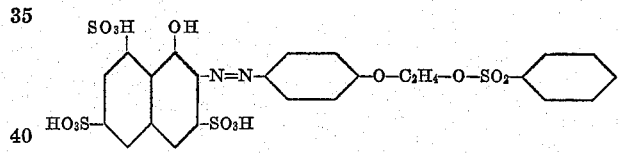

Example 2

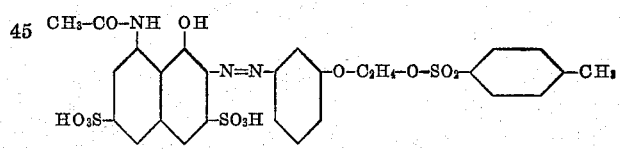

Example 3

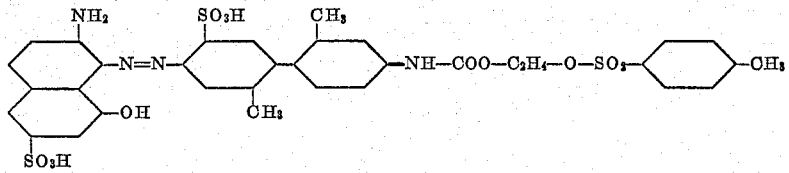

Example 4

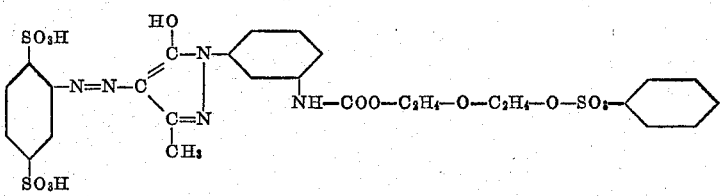

Having thus disclosed the invention, what I claim is:
1. Water soluble mono-azo-dyestuff of the formula

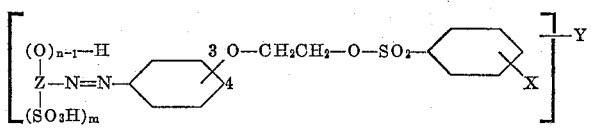

wherein

X is a member selected from the group consisting of H, methyl and Cl,
Z is the naphthalene nucleus,
Y is a member selected from the group consisting of carboxy, sulfonamido, amino, lower monoalkylamino, di(lower) alkylamino, methylsulfonyl and lower alkanoylamino,
n is one of the integers 1 and 2, and
m is one of the integers 1, 2 and 3, the group —OH, when present, being in ortho-position to the —N=N— group, and the —O—CH$_2$CH$_2$—O— group being in one of the positions 3 and 4.

2. A water-soluble dyestuff of the formula

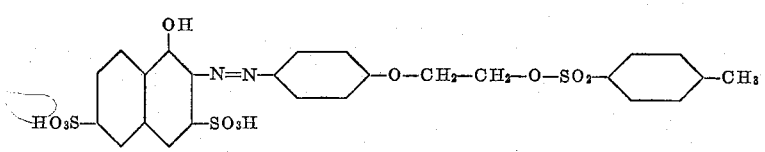

3. A water-soluble dyestuff of the formula

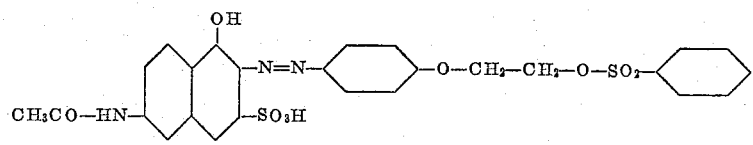

4. A water-soluble dyestuff of the formula

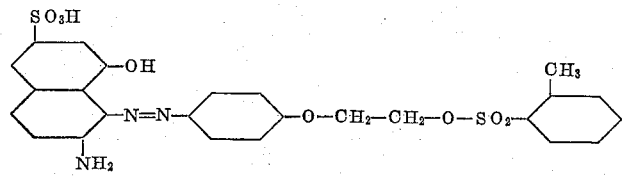

References Cited by the Examiner
UNITED STATES PATENTS

| | | | |
|---|---|---|---|
| 2,128,255 | 8/1938 | Krzikalla | 260—194 X |
| 2,799,672 | 7/1957 | Bollinger | 260—162 |

CHARLES B. PARKER, *Primary Examiner.*
DONALD M. PAPUGA, *Assistant Examiner.*